United States Patent [19]

Carbone et al.

[11] Patent Number: 5,356,984
[45] Date of Patent: Oct. 18, 1994

[54] METHOD FOR MOLDING MAGNETS AND COMPOSITIONS FOR USE THEREIN

[75] Inventors: John W. Carbone, Schenectady; James Day, Scotia; Michael L. Todt, Schenectady, all of N.Y.

[73] Assignee: General Electric Company, Schenectady, N.Y.

[21] Appl. No.: 194,956

[22] Filed: Feb. 14, 1994

[51] Int. Cl.$^5$ .................... C04B 35/00; C08K 3/10; C08L 67/00
[52] U.S. Cl. ................. 524/431; 252/62.51; 252/62.55; 252/500; 252/512; 252/513; 252/518; 252/519; 524/601
[58] Field of Search ............. 252/62.51, 62.55, 500, 252/512, 513, 518, 519; 524/431, 601

[56] References Cited

U.S. PATENT DOCUMENTS 5,191,013 3/1993 Cook et al. .................... 524/601
5,288,447 2/1994 Day .................... 264/112

OTHER PUBLICATIONS

U.S. Patent application Serial No. 08/158,556, filed Nov. 27, 1993.

*Primary Examiner*—Morton Foelak
*Attorney, Agent, or Firm*—William H. Pittman

[57] ABSTRACT

Blends of metallic, preferably ferromagnetic, particles, macrocyclic oligomer compositions, especially poly(alkylene dicarboxylate) oligomers, and catalysts/initiators for polymerization of said macrocyclic oligomers are molded into magnets having high metal loadings, typically about 60-85% by volume. Compression molding of such blends can be conducted at relatively low pressures.

9 Claims, No Drawings

METHOD FOR MOLDING MAGNETS AND COMPOSITIONS FOR USE THEREIN

FIELD OF THE INVENTION

This invention relates to the fabrication of electrically conductive or magnetic articles. More particularly, it relates to the preparation of such articles, especially magnets, from a blend of a metallic material and a relatively low viscosity binder.

It is known to fabricate magnets by blending magnetic material with a thermoplastic binder, such as a polyester or polyamide, and molding the resulting combination. Illustrative molding operations are injection molding and compression molding. High volume fractions of metal are desirable in such magnets, since they permit the fabrication of thin magnet sections.

A disadvantage of molding with the use of thermoplastic binders, however, is that the melt viscosity of the blend becomes unworkably high at moderate to high loadings of magnetic material. In general, the maximum loading that can be tolerated for injection molding is about 60% by volume, with the balance being thermoplastic binder.

It is also known that higher loadings of magnetic material can be tolerated in compression molding than in injection molding operations. For example, loadings of up to 80% have been reported with the use of polyesters such as poly(butylene terephthalate) as binders. Even for compression molding, however, higher loadings than about 75% generally produce compositions with melt viscosities too high for convenient handling. Moreover, molding must be conducted at relatively high pressures, typically at least about 1000 kg./cm.$_2$.

Methods have recently been discovered for the preparation of macrocyclic oligomers of various types, including polycarbonates, polyesters and polyimides. Such oligomer compositions are characterized by very low melt viscosities, and can be converted to conventional linear polymers.

It is also known to produce composites from said macrocyclic oligomer compositions, said composites containing filler materials which serve as reinforcements for the resinous phase after conversion of the macrocyclic oligomers to linear polymer. Both fibrous and particulate fillers may be employed; the particulates include such materials as clay, talc, quartz, wood flour, finely divided carbon and silica. Metallic materials have not been disclosed as fillers, and are of little use as such by reason of their relatively high cost and low or marginal reinforcing capability.

DESCRIPTION OF THE PRIOR ART

The fabrication of magnets by compression molding of magnetic material, using poly(butylene terephthalate) or similar thermoplastic resin as a binder is disclosed in copending, commonly owned application Ser. No. 08/020,968.

Composites prepared from macrocyclic polycarbonate and poly(alkylene dicarboxylate) oligomers, said composites being convertible by polymerization to linear polymer composites, are respectively disclosed in U.S. Pat. No. 4,740,583 and 5,191,013. Macrocyclic polyarylate oligomers, various types of macrocyclic oligomers containing spiro(bis)indane bisphenol-derived units and macrocyclic polyetherimide oligomers, as well as methods for converting said oligomers to linear polymers, are respectively disclosed in U.S. Pat. No. 4,757,132 and U.S. Pat. Re. 4,431 and in copending, commonly owned application Ser. No. 08/80,864. The disclosures of all of the aforementioned patents and application are incorporated herein by reference.

SUMMARY OF THE INVENTION

The present invention provides compositions of relatively low melt viscosity which are convertible by molding, including injection and compression molding, to magnets and/or electrically conductive articles. The binders employed therein are capable of very high volume loading with metallic and especially magnetic materials, with loadings of 80% or greater being typical.

In one of its aspects, the invention includes polymerizable compositions comprising an intimate solid mixture of metallic particles with at least one macrocyclic condensation oligomer composition, said compositions also containing macrocyclic oligomer polymerization catalysts and initiators in amounts effective to convert said oligomer composition to a linear polymer, the proportion of said metallic particles being at least about 60% by volume.

Another aspect of the invention is a method for producing a permanent magnet which comprises intimately blending metallic particles with at least one macrocyclic oligomer composition in the solid state and with macrocyclic oligomer polymerization catalysts and initiators in amounts effective to convert said oligomer composition to a linear polymer, to form a solid mixture in which the proportion of said metallic particles is at least about 60% by volume, and compression molding said mixture at a temperature and pressure effective to convert said oligomer composition to a linear polymer.

DETAILED DESCRIPTION; PREFERRED EMBODIMENTS

Metallic particles are an essential constituent of the compositions of this invention. The metallic particles are generally preferably ferromagnetic, although non-magnetic, conductive metals such as copper may be employed, for example, in the fabrication of articles having controlled resistivity. For brevity, said particles are frequently designated as magnetic hereinafter; however, it should be understood that non-magnetic metallic particles may be employed when the resulting articles are to be used other than as magnets.

Illustrative magnetic metallic particles include those of ferromagnetic metals such as iron and alloys thereof with other materials, both metallic and nonmetallic. A typical permanent magnet alloy is a neodymium-iron-boron alloy. Suitable types of particles thereof include powders, granules and flakes As the binder in the compositions of this invention, a macrocyclic oligomer composition is employed. Numerous compositions of this type, including those described in the aforementioned prior art, may be employed.

The macrocyclic polyester oligomers are generally preferred by reason of their extremely low viscosities, typically up to about 50 centipoise at 190° C. They comprise structural units of the formula

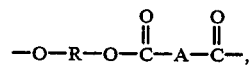

wherein R is an alkylene or mono- or polyoxyalkylene radical containing a straight chain of about 2-8 atoms and A is a m- or p-linked monocyclic aromatic or alicyclic radical. Such oligomers may be prepared as disclosed in U.S. Pat. Nos. 5,039,783, 5,191,013 and 50231,161. Preferably, R is ethylene or (especially) 1,4-butylene and A is m-phenylene or (especially) p-phenylene.

Thus, the preferred oligomers are poly(ethylene terephthalate) or poly(1,4-butylene terephthalate) (hereinafter sometimes "PET" and "PBT", respectively), or the analogous isophthalate, oligomers. Mixtures of these molecular species are included. PET and PBT oligomers are especially preferred.

The macrocyclic polyester oligomers preferably employed according to the present invention are generally mixtures of oligomers of varying degrees of polymerization, usually predominantly from 2 to about 12. Major constituents most often include dimer, trimer, tetramer and pentamer. They are usually substantially free from linear polyesters, including both linear oligomers and high molecular weight polyester. Linears may undesirably increase the viscosity of the macrocyclic composition and correspondingly decrease the ease of handling said composition during formation of the magnetic article. In general, linear species (including oligomers and high polymer) should not be present in amounts greater than about 2% by weight, and should preferably not exceed about 0.1%.

The compositions of this invention also contain macrocyclic oligomer polymerization catalysts and initiators as required to convert the macrocyclic oligomers to linear polymer. Suitable catalysts and initiators are disclosed in the aforementioned patents and application, the disclosures of which are incorporated herein by reference.

In the preferred embodiment of the invention wherein macrocyclic poly(alkylene dicarboxylate) oligomers are employed, effective catalysts include basic reagents, tin alkoxides, organotin compounds (i.e., compounds containing a Sn—C bond), titanate esters and metal acetylacetonates.

Suitable basic reagents include alkali metal salicylates, alkali metal alkoxides and phosphines. Illustrative salicylates are lithium salicylate, sodium salicylate and potassium salicylate, with lithium salicylate generally being preferred. Illustrative alkoxides are the sodium and potassium $C_{1-4}$ alkoxides. Illustrative phosphines include triphenylphosphine and substituted triphenylphosphines, particularly those containing electron-donating substituents such as tris(p-methoxyphenyl)phosphine.

Illustrative tin alkoxides are those containing $C_{1-4}$ alkyl groups; they include stannous methoxide, ethoxide and propoxides. Illustrative organotin compounds are dialkyltin(IV) oxides such as di-n-butyltin(IV) oxide and di-n-octyltin(IV) oxide, as well as dialkyltin(IV) dialkoxides such as di-n-butyltin(IV) di-n-butoxide and heterocyclic analogs thereof such as 2,2di-n-butyl-2-stanna-1,3-dioxacycloheptane. Illustrative titanate esters are isopropyl titanate and 2-ethylhexyl titanate.

The metal acetylacetonates are illustrated by ferric acetylacetonate and cobalt(III) acetylacetonate. They are often advantageously employed in two-component catalyst systems in combination with an aliphatic alcohol, especially a diol such as 1,12-dodecanediol. The metal acetylacetonate and alcohol are generally employed in approximately equimolar proportions.

The compositions of this invention may also contain other constituents, such as lubricants, flow enhancers and mold release agents. Among the materials useful for these purposes are heavy metal salts of fatty acids, as illustrated by zinc stearate. The amount thereof is generally a weight proportion in the range of about 100–300 ppm.

The compositions of this invention generally contain about 60–85% (by volume) magnetic particles. It is highly desirable for the magnetic density of the resulting article to be very high, since the magnetic material is generally the most expensive component employed. At least about 80% magnetic material is usually preferred. Proportions of catalysts and/or initiators are typically in the amount of about 0.01–2.0 and preferably about 0.05–1.0 mole percent based on structural units in the oligomers.

Methods of preparing the compositions of this invention are not particularly limited. In general, dry blending of the magnetic particles with the macrocyclic oligomer composition is satisfactory. Catalysts and initiators may be dispersed in the oligomer composition by dissolving the two in a common solvent and evaporating the solvent, or by spraying a solution of the catalyst/initiator on the surface of the oligomer particles followed by evaporation of the solvent.

The compositions of this invention may be converted to magnetic articles by molding at temperatures in the range of about 160°–300° C. During the molding operation, the macrocyclic oligomers are converted to linear polymer. Since conversion to linear polymer often occurs at a temperature below the melting point of said polymer, isothermal molding is possible.

Any suitable molding operation may be employed, with injection molding and compression molding often being most suitable and compression molding generally being preferred. A particular advantage of compression molding is that it may be conducted at unusually low pressures, generally in the range of about 630–850 kg./cm.$^2$. Further, the low viscosity of the binder makes fabrication of very thin and intricate sections possible.

The invention is illustrated by the following examples.

EXAMPLE 1

A powdered macrocyclic polyester oligomer mixture consisting of 5% (by weight) PET and 95% PBT, having a viscosity at 190° C. of 40 centipoise, was sprayed with a solution in methylene chloride of 2,2-di-n-butyl-2-stanna-1,3-dioxacycloheptane in the amount of 0.5 mole percent based on structural units in the macrocyclic oligomers. The methylene chloride was removed by vacuum stripping and the resulting mixture was stored in a desiccator.

An intimate mixture was prepared by dry blending 1 gram of the macrocyclic polyester oligomers, 30 grams of a particulate ferromagnetic neodymium-iron-boron alloy and 6 mg. of zinc stearate. The blend was placed in the cavity of a cylindrical disk matched die tool which was then placed in a press, heated to 200° C. and pressurized at 703 kg./cm.$_2$. This pressure and temperature were maintained for 10 minutes, after which the tool was allowed to cool to room temperature in the press and the sample was removed. It contained ferromagnetic material in the amount of 80.5% by volume, and exhibited strong cohesion and strength.

EXAMPLE 2

The procedure of Example 1 was repeated, except that the zinc stearate was omitted and the proportions of oligomers and ferromagnetic alloy were adjusted to afford a product containing 64% ferromagnetic material by volume. It had similar mechanical properties.

What is claimed is:

1. A method for producing a permanent magnet which comprises intimately blending ferromagnetic metallic particles with at least one macrocyclic condensation oligomer composition in the solid state and with macrocyclic oligomer polymerization catalysts and initiators in amounts effective to convert said oligomer composition to a linear polymer, to form a solid mixture in which the proportion of said metallic particles is at least about 60% by volume, and compression molding said mixture at a temperature and pressure effective to convert said oligomer composition to a linear polymer.

2. A method according to claim 1 wherein the compression molding is conducted at a pressure in the range of about 630–850 kg./cm.$_2$.

3. A method according to claim 1 wherein the macrocyclic oligomer composition comprises poly(alkylene dicarboxylate) oligomers.

4. A method according to claim 3 wherein the macrocyclic oligomer composition comprises poly(ethylene terephthalate) or poly(1,4-butylene terephthalate) oligomers or mixtures thereof.

5. A method according to claim 3 wherein there is present a basic reagent, a tin alkoxide, an organotin compound, a titanate ester or a metal acetylacetonate as a polymerization catalyst.

6. A method according to claim 3 wherein there is further present a heavy metal salt of a fatty acid.

7. A method according to claim 6 wherein the fatty acid salt is zinc stearate.

8. A method according to claim 3 wherein the proportion of ferromagnetic particles is about 60–85% by volume.

9. A method according to claim 8 wherein the proportion of ferromagnetic particles is about 80–85% by volume.

* * * * *